US009244263B1

(12) United States Patent
Stiefferman et al.

(10) Patent No.: US 9,244,263 B1
(45) Date of Patent: Jan. 26, 2016

(54) MICROSCOPE HEAD WITH MULTIPLE COAXIAL MECHANICAL CONTROLS

(71) Applicant: Global Surgical Corporation, St. Louis, MO (US)

(72) Inventors: Tim Stiefferman, High Ridge, MO (US); Nicholas Toal, St. Louis, MO (US)

(73) Assignee: GLOBAL SURGICAL CORPORATION, St. Louis, MO (US)

( * ) Notice: Subject to any disclaimer, the term of this patent is extended or adjusted under 35 U.S.C. 154(b) by 0 days.

(21) Appl. No.: 14/558,982

(22) Filed: Dec. 3, 2014

(51) Int. Cl.
*G02B 21/00* (2006.01)
*G02B 21/02* (2006.01)
*G02B 21/24* (2006.01)
*G02B 21/22* (2006.01)
*G02B 21/18* (2006.01)
*G02B 21/20* (2006.01)

(52) U.S. Cl.
CPC .............. *G02B 21/025* (2013.01); *G02B 21/24* (2013.01); *G02B 21/18* (2013.01); *G02B 21/20* (2013.01); *G02B 21/22* (2013.01)

(58) Field of Classification Search
CPC ........ G02B 21/18; G02B 21/20; G02B 21/22; G02B 21/24
USPC ................................. 359/368, 375–378, 384
See application file for complete search history.

(56) References Cited

U.S. PATENT DOCUMENTS

| | | | | |
|---|---|---|---|---|
| 3,762,797 A * | 10/1973 | Heller | ................ | F16M 11/08 359/375 |
| 4,447,139 A * | 5/1984 | Biber | ................ | F16C 11/106 359/377 |
| 4,919,001 A | 4/1990 | Ogiwara et al. | | |
| 5,121,655 A | 6/1992 | Toshimitsu | | |
| 5,642,220 A * | 6/1997 | Kleinberg | ............. | G02B 7/001 359/368 |
| 5,861,983 A | 1/1999 | Twisselman | | |
| 6,947,211 B2 * | 9/2005 | Metelski | ............... | A61B 19/26 359/368 |
| 8,416,492 B2 * | 4/2013 | Enge | ..................... | A61B 19/26 359/368 |
| 2006/0146401 A1 * | 7/2006 | Nakamura | ............ | G02B 21/22 359/384 |
| 2013/0327902 A1 | 12/2013 | Frick et al. | | |

* cited by examiner

*Primary Examiner* — Frank Font
(74) *Attorney, Agent, or Firm* — Michael L. Smith

(57) ABSTRACT

A microscope head includes a housing having a pivot axis located generally at a center of gravity of the housing. At least one handle is connected to the housing coaxially with the pivot axis. Mounting structure is for rotatably mounting a support arm coaxially with the pivot axis. A tension control ring is attached coaxially with the pivot axis for varying a rotation force required to rotate the housing with the handle about the pivot axis. A magnification selector mechanism is connected to the housing coaxially with the pivot axis.

12 Claims, 3 Drawing Sheets

MICROSCOPE HEAD WITH MULTIPLE COAXIAL MECHANICAL CONTROLS

FIELD

The present disclosure relates to a microscope having multiple coaxial mechanical controls. More specifically, the present disclosure relates to a microscope head having a pivot axis located generally at a center of gravity of the head with multiple mechanical controls coaxial with the pivot axis.

BACKGROUND

This section provides background information related to the present disclosure which is not necessarily prior art.

Microscope heads are known to have multiple adjustment mechanisms, such as handles, knobs, and support arm connectors. These adjustment mechanisms are often dispersed at different locations on the microscope head. A microscope user often needs to change the view field of the microscope and this in turn requires the microscope head to be moved or rotated. The microscope user often desires to change the view field while simultaneously maintaining a view through the microscope. Maintaining one's gaze through the microscope while moving the microscope to a new view field requires the user to have detailed knowledge of the location of the multiple adjustment mechanisms and make those adjustments without visual feedback and without causing excessive movement of the microscope by fumbling for the proper adjustment mechanism.

In addition, different adjustment mechanisms may work against each other creating undesired movements of the microscope/microscope head. For example, FIG. 1 shows a prior art microscope head 10 attached to a support arm 12 at a pivot connector 14 located at the upper left portion of microscope head 10. It is noted that in use, microscope head 10 may further include an unshown pair of eye-pieces and an unshown objective lens. Handles 16 are attached to microscope head 10 at handle connector 18 located towards the lower right portion of microscope head 10. A user attempting to rotate microscope head 10 about pivot connector 14 by manipulating handle 16 is likely to cause undesired movement of the microscope head in a vertical direction indicated by arrow 20 and/or in a horizontal direction indicated by arrow 22. The undesired movement is mainly caused by the spaced apart locations of connectors 14 and 18 creating undesired force moments when a user pushes or pulls on handle 16 attempting to only rotate the microscope. Further, because pivot connector 14 is located at an outer portion or microscope head 10, away from microscope head 10's center of gravity the tension required between pivot connector 14 and support arm 12 may be significant to reliably and stably hold the microscope head 10 in a desired position.

Even if the pivot connector 14 and handle connector 18 were coaxial and located at the microscope head 10's center of gravity, manipulation of the non-coaxial, radially extending handle tension adjustment knob 24 and adjustment buttons 26 are likely to cause unwanted movement of the microscope head by the torqueing forces created when the user operates knob 24 and buttons 26. In addition, the adjustment buttons 26 require a user to memorize the layout configuration and function(s) of each button at each location, if the user is to operate the buttons 26 without removing his gaze from the microscope's view field. The buttons 26 also add significant cost to the microscope because of the required electrical power supply, wiring connections, software, and control circuitry, compared to a microscope with only mechanical adjustment mechanisms. It is also known to provide an adjustment mechanism, such as a focus knob 28 coaxial with handle connector 18. If coaxial focus knob 28 is provided and the pivot connector 14 is coaxial with the handle connector 18 then a prior art pivot tension knob has been provided that projects radially from the handle connector 18. This pivot extension knob is similar to and in addition to knob 24 and provides the necessary tension for holding the microscope head 10 in a desired position.

Thus, there is a desire for an economical, reliable microscope/microscope head that provides a user with adjustment mechanisms that are easy to manipulate and locate without removing his gaze from the microscope view field and without causing excessive unwanted movement of the microscope head.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 2:
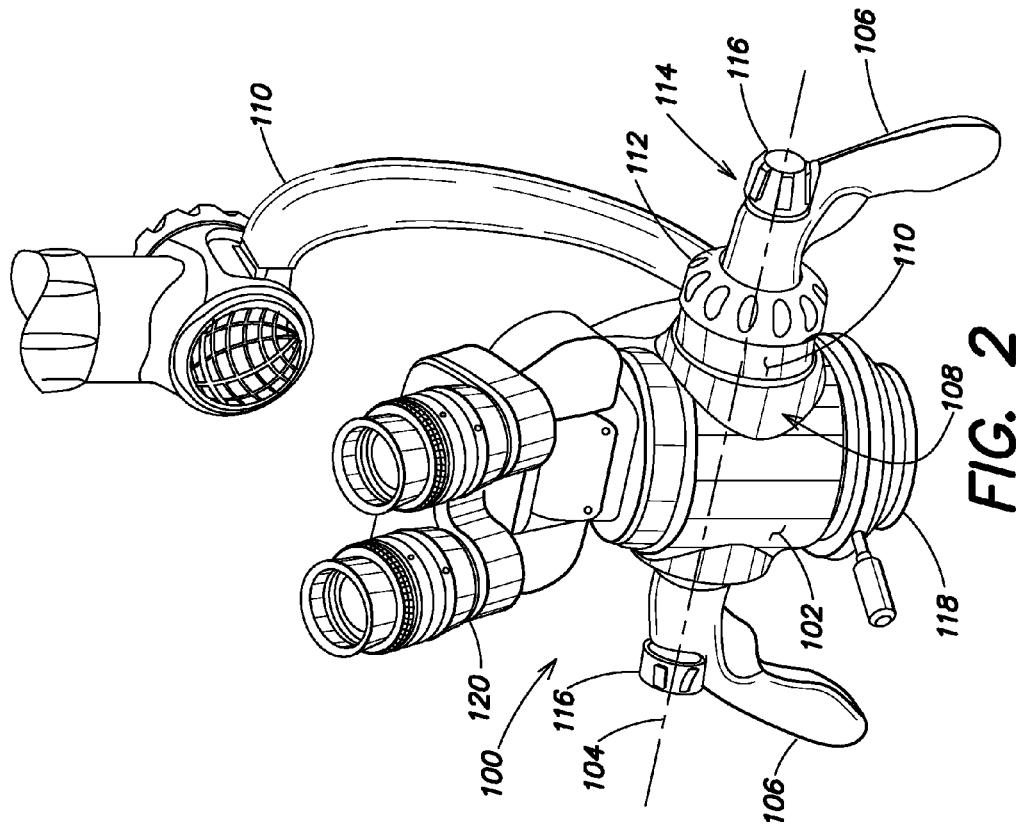
FIG. 2 is a partial perspective of an example microscope head with multiple coaxial mechanical controls and including attached hardware.
Figure 1:
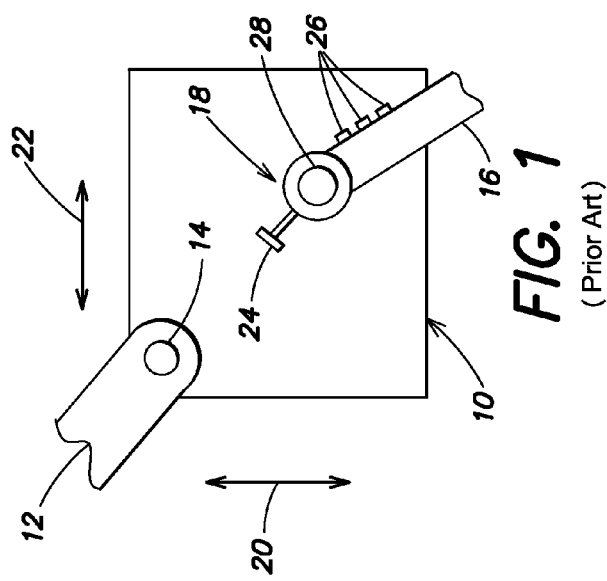
FIG. 1 is a modified block diagram of a prior art microscope mounted on a support arm.

The FIG. 2 example shows a microscope head 100 having a housing 102 with a pivot axis 104 located generally at a center of gravity of the housing 102. The phrase "generally at a center of gravity" means generally a center or axis about which a mass of an object or assembly is balanced. For the housing 102 the center of gravity is a location halfway between the top and bottom of housing 102 and halfway between a front and back of housing 102 for a symmetrical housing 102. Placing the pivot axis 104 generally coaxial with the center of gravity of housing 102 allows the tension between the microscope head 100 and a support arm to hold the microscope head 100 in a desired position to be minimized compared to a microscope head having a pivot axis located away from the housing 102's center of gravity. If the housing's weight distribution is not uniform across its form factor the center of gravity will necessarily shift away from the central location described above and the pivot axis 104 will also move to coincide with the center of gravity.

At least one handle 106 may be connected to the housing 102 coaxially with the pivot axis 104. The handle or handles 106 may be any appropriate handle suitable for manipulating the microscope head 100 into a desired position. The handle 106 may include a portion that extends non-coaxially away from pivot axis 104 or handle 106 may be a coaxial grip (not shown). Handle 106 may also be attached about pivot axis 104 in a fixed position or there may be structure allowing handle 106 to be moved about pivot axis 104 to a plurality of positions.

Mounting structure, shown generally at 108, is for rotatably mounting a support arm 110 coaxially with the pivot axis 104. Example mounting structure 108 is described in more detail below.

A tension control ring 112 is attached coaxially with the pivot axis 104 for varying a rotation force required to rotate the housing 102 with at least one handle 106 about the pivot axis 104. Mounting structure 108 and tension control ring 112 interact as described below. By having a user manipulated tension ring 112 coaxial with pivot axis 104 the tendency of a user to pull or push the housing 102 in an undesired direction is minimized, compared to prior art mechanisms for tensioning a microscope head about a pivot axis. Because the tension ring 112 is coaxial with the pivot axis and the housing center of gravity the user may manipulate the tension ring 112 without pulling or pushing the housing 102 away from the established housing 102 location. In contrast, prior art pivot tension mechanisms provided knobs that radially extended away from pivot axis and required a user to move his hand a distance from and essentially orthogonal to the pivot axis. This prior art user hand movement often resulted in the user unintentionally pushing or pulling the microscope head away from the desired, established pivot axis position.

A magnification selector mechanism 114 is connected to the housing 102 coaxially with the pivot axis 104. The magnification selector mechanism is described in more detail below and may be any acceptable mechanism that allows multiple levels of magnification to be selected by a user manipulating the knob 116 shown. Again, because knob 116 and the required user manipulation movement are coaxial with the pivot axis, any undesired microscope head 100 movement caused by a user changing magnification levels during use is minimized or eliminated.

The housing 102 may also include an objective lens 118 and an inclinable binocular unit 120 attached to the housing 102, as shown. The microscope head 100 may further include a second handle 106 positioned opposite the other handle 106 and connected to the housing 102 coaxially with the pivot axis 104, as shown.

Figure 3:
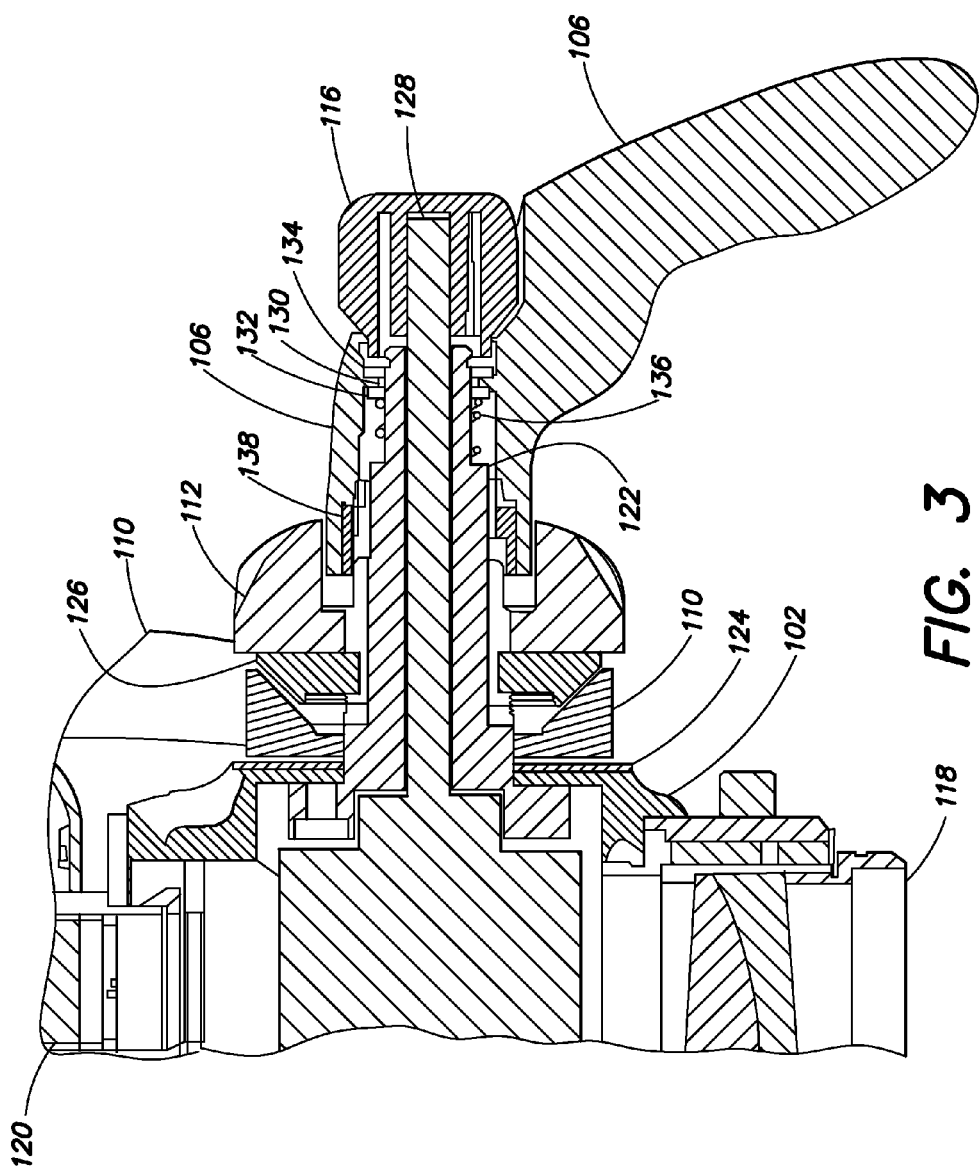
FIG. 3 is a partial cut-away view of FIG. 2.

Mounting structure 108, shown in more detail in FIG. 3, is for rotatably mounting the support arm 110 to the microscope head 100. Mounting structure 108 includes a microscope mount 122 for holding each of a brake washer 124 (best seen in FIG. 4) and a conical brake washer 126 positioned on opposing sides of the support arm 110. Brake washer 124 is positioned between support arm 110 and housing 102 as a bearing surface for rotation of housing 102 relative to support arm 110.

Tension control ring 112 is threadably attached to the microscope mount 122 such that a frictional force between each of the brake washer 124, conical brake washer 126, and the support arm 110 may be adjusted as desired. Because tension control ring 112 and a user's corresponding manipulating movement are coaxial with pivot axis 104 any undesired movement of microscope head 100 from its established position is minimized or eliminated compared to the prior art that provided radially extending knobs. Further because the microscope mount 122 establishes the pivot axis 104 and is coaxial with housing 102's center of gravity the tension necessary to establish a desired position of microscope 100 is much less compared to the prior art examples with a pivot axis located a distance away from a center of gravity. This less tension also allows for easier and quicker rotation of the microscope head 100 about the pivot axis 104 because there is not as much tension to overcome when rotating microscope head 100.

Knob 116 may cooperate with additional parts of magnification selector mechanism 114 such that rotation of knob 116 causes shaft 128 to rotate to change the magnification level. Handle 106 may be pushed inward (towards housing 102), along pivot axis 104, releasing handle insert 138 and allowing handle 106 to be repositioned. Once a user releases handle 106, compression spring 136 causes handle insert 138 to reengage and lock handle 106 is its new position. Handle insert 138 also acts as a rotation bearing surface between microscope mount 122 and handle 106.

Figure 4:
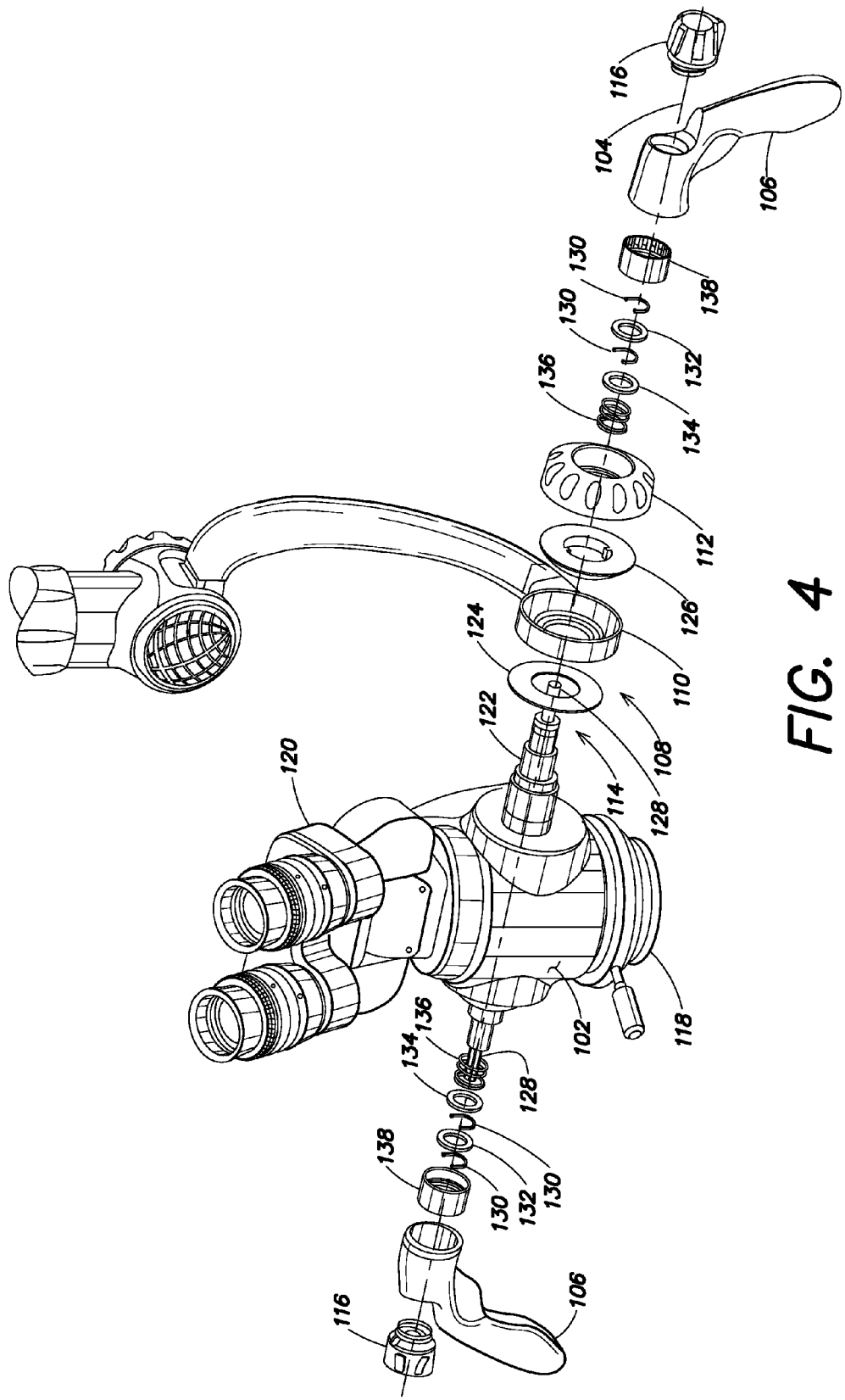
FIG. 4 is a partial exploded view of FIG. 2.

Microscope head 100 is shown in an exploded view in FIG. 4. Housing 102 includes a mount 122 extending from the housing 102 generally at a center of gravity of the housing 102. The mount 122 defines a pivot axis 104. At least one handle 106 is attached to the mount 122 coaxially with the pivot axis 104, a portion of the at least one handle 106 extends non-coaxially from the pivot axis 104, as shown.

Mounting structure 108 is for rotatably attaching a support arm 110 to the mount 122 for rotating the housing 102 about the pivot axis 104. Mounting structure 108 may include brake washer 124 and conical brake washer 126, as shown.

Tension control ring 112 is attached to the mount 122 coaxially with the pivot axis 104 for varying a rotation force required to rotate the housing 102 with the at least one handle 106 about the pivot axis 104 when the housing 102 is attached to the support arm 110.

Magnification selector mechanism 114 is formed within the mount 122 coaxially with the pivot axis 104. In the example shown, magnification selector mechanism 114 may include knob 116 attached to shaft 128. Rotation of knob 116 causes shaft 128 to rotate and change the magnification level selected.

FIG. 4 further shows an example including a second handle 106 positioned opposite the other handle 106 and connected to the housing 102 coaxially with the pivot axis 104 and a second magnification selector mechanism 114 with similar associated parts to those described above, as indicated by the use of the same reference numbers.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A microscope head comprising:
   a housing having a pivot axis located generally at a center of gravity of the housing;
   at least one handle connected to the housing coaxially with the pivot axis;
   mounting structure for rotatably mounting a support arm coaxially with the pivot axis;
   a tension control ring attached coaxially with the pivot axis for varying a rotation force required to rotate the housing with the at least one handle about the pivot axis; and
   a magnification selector mechanism connected to the housing coaxially with the pivot axis.

2. The microscope head of claim 1 wherein the housing includes an objective lens.

3. The microscope head of claim 2 wherein the housing further includes an inclinable binocular unit attached to the housing.

4. The microscope head of claim 1 further including a second handle positioned opposite the at least one handle and connected to the housing coaxially with the pivot axis.

5. The microscope head of claim 1 wherein the mounting structure includes a microscope mount for holding each of a brake washer and a conical brake washer positioned on opposing sides of the support arm.

6. The microscope head of claim 5 wherein the tension control ring is threadably attached to the microscope mount such that a frictional force between each of the brake washer, conical brake washer, and the support arm may be adjusted.

7. A microscope head comprising:
   a housing including a mount extending from the housing generally at a center of gravity of the housing, the mount defining a pivot axis;
   at least one handle attached to the mount coaxially with the pivot axis, a portion of the at least one handle extending non-coaxially from the pivot axis;
   mounting structure for rotatably attaching a support arm to the mount for rotating the housing about the pivot axis;
   a tension control ring attached to the mount coaxially with the pivot axis for varying a rotation force required to rotate the housing with the at least one handle about the pivot axis when the housing is attached to the support arm; and
   a magnification selector mechanism formed within the mount coaxially with the pivot axis.

8. The microscope head of claim 7 wherein the housing includes an objective lens.

9. The microscope head of claim 8 wherein the housing further includes an inclinable binocular unit attached to the housing.

10. The microscope head of claim 7 further including a second handle positioned opposite the at least one handle and connected to the housing coaxially with the pivot axis.

11. The microscope head of claim 7 wherein the mounting structure includes each of a brake washer and a conical brake washer positioned on opposing sides of the support arm.

12. The microscope head of claim 11 wherein the tension control ring is threadably attached to the microscope mount such that a frictional force between each of the brake washer, conical brake washer, and the support arm may be adjusted.

* * * * *